United States Patent [19]

McMahon et al.

[11] 4,416,674
[45] Nov. 22, 1983

[54] FILTER FOR TREATING A PARTICLE-CARRYING GASEOUS STREAM

[75] Inventors: Matthew A. McMahon, Wappingers Falls; Raymond F. Wilson; King D. Eng, both of Fishkill; Robert B. Burns, Huntington, all of N.Y.

[73] Assignee: Texaco Inc., White Plains, N.Y.

[21] Appl. No.: 360,707

[22] Filed: Mar. 22, 1982

Related U.S. Application Data

[63] Continuation of Ser. No. 200,754, Oct. 27, 1980, abandoned.

[51] Int. Cl.$^3$ .................. B01D 50/00; B01D 39/20; F01N 3/28
[52] U.S. Cl. ............................... 55/485; 55/501; 55/502; 55/513; 55/DIG. 30; 422/171; 422/179
[58] Field of Search ............... 55/485, 501, 502, 513, 55/509, 518, 523–526, DIG. 30; 60/299, 301, 302, 311; 422/171, 176, 179, 180

[56] References Cited

U.S. PATENT DOCUMENTS

| | | | |
|---|---|---|---|
| 2,132,940 | 10/1938 | Farmer | 55/502 |
| 3,105,570 | 10/1963 | Bezemes | 55/485 |
| 3,163,256 | 12/1964 | Lanning | 422/171 |
| 3,623,295 | 11/1971 | Shriner | 55/485 |
| 3,754,870 | 8/1973 | Carnahan et al. | 422/171 |
| 3,771,967 | 11/1973 | Nowak | 422/179 |
| 3,802,163 | 4/1974 | Riojas | 55/524 |
| 3,852,042 | 12/1974 | Wagner | 422/176 |
| 3,860,403 | 1/1975 | Aoi | 55/485 |
| 4,224,285 | 9/1980 | Mayer | 55/509 |
| 4,264,346 | 4/1981 | Mann | 55/523 |
| 4,346,557 | 8/1982 | Shadman et al. | 55/DIG. 30 |

Primary Examiner—David L. Lacey
Attorney, Agent, or Firm—Carl G. Ries; Robert A. Kulason; Robert B. Burns

[57] ABSTRACT

Filter for treating a gas such as the exhaust gas stream from a diesel engine, which exhaust gas often conveys carbon particles into the atmosphere. The treating filter comprises a casing holding a plurality of serially arranged filter beds. The latter are comprised of monolith ceramic discs, and are maintained in spaced apart relationship by spacer rings to define a turbulation chamber between adjacent beds. Said beds are provided with an oxidation catalyst to promote incineration of the retained particles. The beds further serve to reinforce and support a non-rigid filtering media contained within the respective chambers.

2 Claims, 4 Drawing Figures

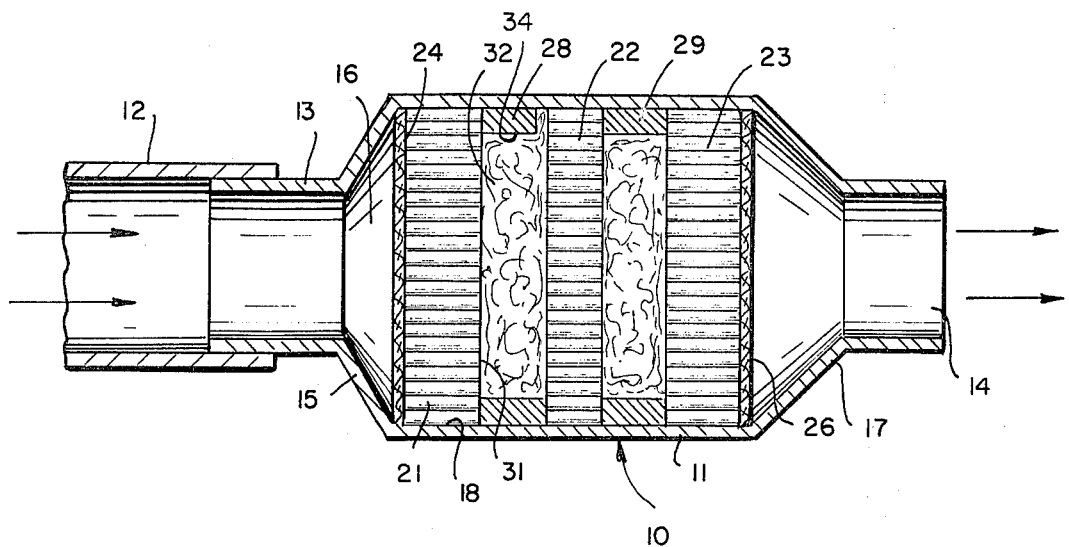
FIG. 1
FIG. 3
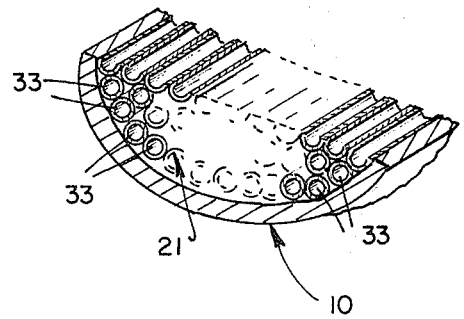
FIG. 2
FIG. 4
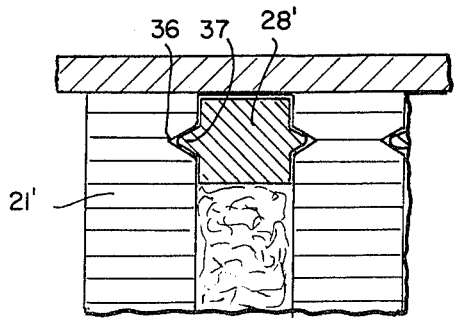

FILTER FOR TREATING A PARTICLE-CARRYING GASEOUS STREAM

This is a continuation, of application Ser. No. 200,754, filed Oct. 27, 1980, now abandoned.

BACKGROUND OF THE INVENTION

In the operation of any internal combustion engines, and particularly engines of the diesel type, a hot, rapidly flowing exhaust gas stream is created. While the exhaust streams from both engines will carry a certain amount of particulate matter, the diesel normally carries a much greater amount than does the ordinary spark ignited engine.

In the instance of a diesel engine such particles represent a product of combustion which is passed from the engine combustion chamber, through the engine filter or muffler, and into the atmosphere. These particulate products of combustion normally comprise bits of carbon and are clearly identifiable in the operation of any diesel engine by the dark smoke which is sometimes emitted as exhaust gas.

The offensiveness of these carbon particles is emphasized under certain engine conditions when a particularly heavy smoke is ejected. Often such a period occurs during a sharp acceleration period of when the engine is idling.

A diesel engine exhaust gas temperature will vary in response to the load and speed at which the engine operates. Consequently, the degree to which combustible particulate matter will be burned, varies. It is expected therefore that under some engine conditions there will be a greater amount of the particulate products of combustion than at other conditions.

Since the ordinary diesel frequently operates at lower temperatures, it is desirable that the exhaust gas be treated such that particulate matter is removed from the exhaust stream. This is achieved in one respect by the imposition of a filter medium in the exhaust system.

The normal exhaust gas filter comprises a means for intercepting the gaseous flow and for retaining the combustible particles within the passages of the filter media. Such filters are well known in the art and are used in many instances where it is desired to retain particulate matter from being carried by a gaseous stream.

However, in the instance of an engine of the type contemplated, it is found that particles which are accumulated in the filter will eventually impair gas flow therethrough. The ultimate result could be the complete blocking of the filter bed such that the gas stream will no longer pass and consequently impede operation of the engine.

It has therefore been found necessary in the use of such smoke eliminating or particle-retaining filters, to periodically purge the filter bed such that the combustible matter will be incinerated and removed. Further, it is found practical to achieve this particle incineration step on a time basis to assure optimum filtering capability of the filter under all engine operating loads.

In one form of filter bed utilized in such a gas treating apparatus, the filter media comprises a mass of randomly disposed fibrils or metallic wires. The latter are disposed to form discrete gaseous passages therethrough. This type of filter media is found to be highly effective for removing particulate matter since the media has the effect of providing the greatest contact area between the passing gas stream and the filter surfaces.

This type of filter, however, is fragile and susceptible to damage and distortion due to excessive temperatures which might be reached during the incineration period. The thin fibrils will then be weakened and distort, thereby instituting openings which permit the hot exhaust gas to bypass the filter bed.

To promote the retention, and subsequent eventual incineration of combustible particles, the filter media can be provided with a catalytic material. Thus, incineration of the particles will occur at a lower temperature than if a catalyst is not utilized. A further advantage to the method of treating engine exhaust gases at regular intervals, is that the incinerating period need only be maintained for relatively short intervals to purge the filter bed or beds.

Toward overcoming the foregoing problems, the present filter is provided, into which a hot exhaust gas stream carrying solid combustible particles can be introduced. The filter comprises a series of rigid filter beds which are carried within a surrounding housing or casing and which are spaced one from the other by intermediate spacer members disposed therebetween.

Turbulation chambers which are defined between adjacent filter beds can be provided with a frangible filter medium such as steel wool or the like. However, the beds themselves are fabricated of a monolithic structured, disc-like member which is retained within the steel filter casing or housing. The latter is provided with access means whereby a flow of hot exhaust gas can be caused to flow through the serially aligned filter beds.

It is therefore an object of the invention to provide a filter of the type contemplated for efficiently and effectively treating a hot diesel exhaust gas stream. A further object is to provide a filter of the type which is capable of removing combustible particulate matter from a hot exhaust gas stream. A still further object is to provide a filter which is adapted to be rejuvenated periodically by incineration of retained combustible particles such that the filtering components are not adversely affected by excessive temperatures.

DESCRIPTION OF THE DRAWINGS

FIG. 1 is an elevation view in cross section of a filter of the type contemplated.

FIG. 2 is an enlarged segmentary view of a monolithic filter bed as shown in FIG. 1.

FIG. 3 is an enlarged segmentary view in cross section of an alternate embodiment of the filter structure.

FIG. 4 is similar to FIG. 3.

Referring to the drawings, a filter 10 of the type contemplated is illustrated and which comprises in essence a metallic housing or casing 11. The latter is preferably formed in circular cross section although it can as well assume a substantially oblong or other appropriate cross sectional area to conform with the shape of casing 11.

A stream of hot exhaust diesel gas is introduced from an exhaust gas conduit 12 to one end of the filter 10, which defines a gas inlet 13.

The opposed end of said casing 11 is comprised of an outlet 14 through which the substantially particle-free exhaust gas is permitted to flow. The gaseous stream, after being filtered can be introduced to the atmosphere. Alternatively it can be further treated by a muffler or the like connected downstream of filter 10.

In accordance with the normal filter construction, casing 11, which defines a central filter chamber 18, is provided at one end with a frusto conical member 15 which defines inlet 13 as well as diffusion chamber 16 at the upstream end of the filter bed series.

Similarly, the downstream end of filter casing 11 is provided with a frusto conical wall 17 into which the exhaust gas outlet 14 is formed.

A series of thin filter beds 21, 22 and 23 are maintained longitudinally through the filter compartment by terminally disposed support panels 24 and 26. In one embodiment, the latter can comprise a metallic mesh or screen member such as stainless steel or the like. Said members are positioned within the filter compartment to bear against end filter sections 21 and 23, and yet be pervious to the flow of exhaust gas.

Casing 11 is normally formed of a metal such as steel having sufficient wall thickness to withstand the elevated temperature as well as the conditions under which it will normally function. The casing, because of the excessive temperatures and variations thereof, will also be subjected to a certain amount of expansion and contraction. The latter action will occur in accordance with the phase of operation of the engine, and the temperature of the exhaust gas passing through the filter.

Filter chamber 18 is provided as noted with a plurality of sequentially arranged filter beds 21, 22 and 23. The latter are disposed longitudinally through chamber 18, being spaced one from the other by a plurality of spacer rings 28 and 29.

The latter are disposed at the periphery of the respective beds, and are positioned to slidably contact the adjacent casing wall while concurrently being in abutting relationship with contiguous beds. Thus, a turbulation chamber 31 defined by the spacer 28, as well as by the adjacent beds 21 and 22, is formed.

Referring to FIG. 2, the respective filter beds 21, 22 and 23 are longitudinally disposed and spaced, and comprise a disc-shaped monolith structured ceramic member which extends transversely across chamber 18. Such monolith structures are well known in the industry and are often used for the purpose of contacting a passing gas stream to achieve a filtering or other action on the gaseous stream.

In the present embodiment, bed 21 for example, is comprised of a porous ceramic or refractory material having a skeletal structure. The structure in effect is comprised of a series of micro pores or passages which define a large number of horizontal gas passages 33.

To promote oxidation of the hot exhaust gas which passes through bed 21, micro passages 33 can be provided with a catalytic material as well as with a layer of a base material.

In the present arrangement, the porous skeletal structure of the filter bed 21 is provided with a coating of alumina. This layer can be applied in a number of ways although among the simplest is by immersing the uncoated bed into a solution of a suitable coating material. It is thus maintained immersed for a sufficient time to permit deposition of a desired alumina coating onto the various passage walls. This process is disclosed in U.S. Pat. No. 3,362,783, Leak et al.

Preferably, the thickness of the alumina is maintained sufficient to provide an adequate coating to the walls of each passage 33. However the coating cannot seriously impede flow of gas passing therethrough by overly constricting the passage opening.

In the present arrangement, the ceramic beds, 21 for example, were formed of a circular block of monolithic structured material having a diameter of about 6 inches. To permit the desired filtering action capable of retaining the carbonaceous particles from the exhaust gas stream, the respective beds 21, 22 and 23 were approximately ⅜ of an inch in length.

Each of the serially aligned filter beds was separated from contiguous beds by an annular spacer ring 28. The latter member can be formed of a metal having a compatible expansion rate with the casing 11, as well as with the ceramic filter beds. Further, ring 28 is provided with an internal opening sufficient to allow maximum gas flow through the respective beds.

Spacer ring 28 can also be formed of a ceramic material compatible with that from which the beds 21, 22 and 23 were formed. Similarly, the ring can be provided particularly on its inner surface defined by the central opening 34, with a coating of a suitable material such as alumina whereby to improve the particle retention capabilities of the entire unit.

The intermediate spaces such as turbulation chambers 31 defined between adjacent filter beds 21 and 22, permits exhaust gas which emerges from the respective passages 33 of the upstream bed, to expand slightly. This expansion will encourage a degree of turbulance to the gas. Thereafter, the gas upon traversing said turbulation chamber 31 will enter the next series of passages 33 in the subsequently positioned filter bed 22.

In one embodiment of the invention, the turbulation chamber 31 is provided with a frangible non-rigid filter media 32 such as steel wool or the like. Said media is compressed into turbulation chamber 31 in a manner that it will define randomly disposed passages through which the exhaust gas will pass.

This non-rigid media 32 can be comprised as noted of metallic wires or fibrils wich can further be provided with a coating such as alumina or the like. The media 32 is therefore capable of retaining combustible particles from the exhaust gas stream.

Although the width of turbulation chamber 31 is controlled by the width of spacer 28, the density of the filter media 32 within said chamber can be adjusted in accordance with the filtering capabilities desired. Further, the degree of turbulation which is to be provided to the gas passing through chamber 31 is of relevance. Thus, the amount of the steel wool which is initially inserted into turbulation chamber 31 during assembly of the filter, will determine the density of the said unit after the filter is completely assembled.

In another embodiment of the filter structure as shown in FIG. 3, the respective members are substantially as shown in FIG. 1. The periphery of ceramic filter bed 21', and the spacer ring 28', are maintained in a static condition by provision of a locking joint therebetween. Said peripheral locking joint can assume a number of embodiments. The present joint is comprised of an annular groove 36 which is formed into the peripheral face of ceramic block 28'. Said groove registers with a similarly shaped, or corresponding rim 37, which protrudes from the face of spacer ring 28'.

Thus, when the spacer ring and bed are brought into abutting engagement, there will be minimal movement therebetween and yet not constitute a rigid inflexible engagement. This connection is advantageous to preserve the respective members from cracking or distortion in spite of the excessively high temperatures and temperature variations to which the filter will be subjected as hot exhaust gases pass therethrough.

Referring to FIG. 4, the basic filter corresponds to that shown in FIg. 1. To further assure the firm positioning of the non-rigid filter media 32" within turbulation chamber 31", the outer edge of the media mass 32" can be compressed between the adjacent contacting surfaces of the respective filter block 21" and 22", and the spacer 28".

As shown, spacer 28" is urged firmly into the contiguous surface of the filter bed 21", thereby squeezing the peripheral edge of the steel wool filter media 32" in such manner as to firmly retain the latter in place. Thus, even though the filter unit is subjected to relatively high temperatures which will tend to distort, displace and damage the fragible steel wool media 32", the latter will nonetheless be maintained in place. This gripping at the peripheral edge will preclude the forming of undesired openings through which the gas could pass unfiltered.

During assembly thereof, the filter unit can be provided with a sufficient number of beds 21. The latter is determined in accordance with the volume of gas which is to be treated, and with the amount of carbon or combustible particulate matter to be removed therefrom. In any event, the respective filter beds are inserted into casing 11 alternately with spacer rings 28 therebetween. After the spacers and the beds are firmly urged into place within casing 11, the end support screen, and the end wall are fastened in place to close the filter.

Operationally, as hot exhaust gas is introduced through inlet 13 to the filter chamber 18, the gas will be dispersed substantially across the face of initial filter bed 21 and traverse the filter bed passages 33. Upon entering the turbulation chamber, the gas will further pass through the tortuous passages defined by the steel wool media 32.

In the latter, contact of the gas with the alumina coated walls of the steel wool fibers will cause further particles to be removed and retained from the gas stream. As the latter progresses through the series of filter sections, additional particles will be further retained whereby the filter will ideally retain all particulate matter from the exhaust stream.

Eventually the carbon or combustible particulate matter which has accumulated in the various filter beds and turbulation chamber will be removed by incineration or similar purging process.

Other modifications and variations of the invention as hereinbefore set forth can be made without departing from the spirit and scope thereof, and therefore, only such limitations should be imposed as are indicated in the appended claims.

We claim:

1. Apparatus for removing particulate matter from a hot gaseous stream which comprises;
    a casing 11 having an inner wall which defines an elongated filter chamber 18,
    inlet 13 and outlet 14 means communicating with said filter chamber 18 to conduct said hot gaseous stream therethrough,
    a plurality of adjacently positioned rigid filter beds 21, 22, 23, fixedly disposed within said filter chamber 18, and each comprising a disc-like, monolith structured, ceramic member extending transversely of said filter chamber 18, the respective filter beds being spaced apart to define a turbulation chamber 31 therebetween,
    a spacer ring 28 disposed within said turbulation chamber defining the periphery thereof, and being in abutting engagement with disc-like ceramic members,
    a gas pervious, non-rigid filter media mass comprised of randomly disposed fibrils being positioned in said turbulation chamber so as to substantially fill said turbulation chamber, at least a segment of said fibrils being disposed adjacent to the spacer ring 28 and being compressibly retained between the abuttingly engaged spacer ring and said disc-like ceramic members.

2. Apparatus as defined in claim 1 wherein said adjacent filter beds 21 and 22, and said spacer ring 28 disposed therebetween, are maintained in abutting engagement by an annular locking joint defined by an annular groove 36 positioned in each of said disc-like ceramic members, which registers with a rim 37 on said spacer ring, and said segment of said fibrils is compressibly retained within said locking joint.

* * * * *